US009473697B2

(12) United States Patent
Jeung

(10) Patent No.: US 9,473,697 B2
(45) Date of Patent: Oct. 18, 2016

(54) MOBILE TERMINAL AND CONTROLLING METHOD THEREOF

(71) Applicant: LG ELECTRONICS INC., Seoul (KR)

(72) Inventor: Younghoon Jeung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/713,927

(22) Filed: May 15, 2015

(65) Prior Publication Data

US 2015/0334293 A1 Nov. 19, 2015

(30) Foreign Application Priority Data

May 16, 2014 (KR) ........................ 10-2014-0059098

(51) Int. Cl.
*H04N 5/232* (2006.01)
*H04N 5/77* (2006.01)
*G11B 15/02* (2006.01)
*G06F 3/0481* (2013.01)

(52) U.S. Cl.
CPC ........ *H04N 5/23222* (2013.01); *G06F 3/0481* (2013.01); *G11B 15/02* (2013.01); *H04N 5/232* (2013.01); *H04N 5/23293* (2013.01); *H04N 5/23296* (2013.01); *H04N 5/772* (2013.01)

(58) Field of Classification Search
CPC ............ G06F 117/3079; H04N 5/232; H04N 5/23296; H05N 7/772
See application file for complete search history.

(56) References Cited

U.S. PATENT DOCUMENTS

2008/0048870 A1* 2/2008 Laitta ............... G08B 13/19652
340/573.6
2013/0293720 A1* 11/2013 Tyson .................... H04N 7/181
348/159

* cited by examiner

*Primary Examiner* — Huy T Nguyen
(74) *Attorney, Agent, or Firm* — Birch, Stewart, Kolasch & Birch, LLP

(57) ABSTRACT

A mobile terminal including a camera; a display unit configured to display a preview image input through the camera; and a controller configured to select an object in the preview image in response to a user input for touching the object or setting a specific region comprising the object; and output an alarm when the object moves out from the preview image.

20 Claims, 21 Drawing Sheets

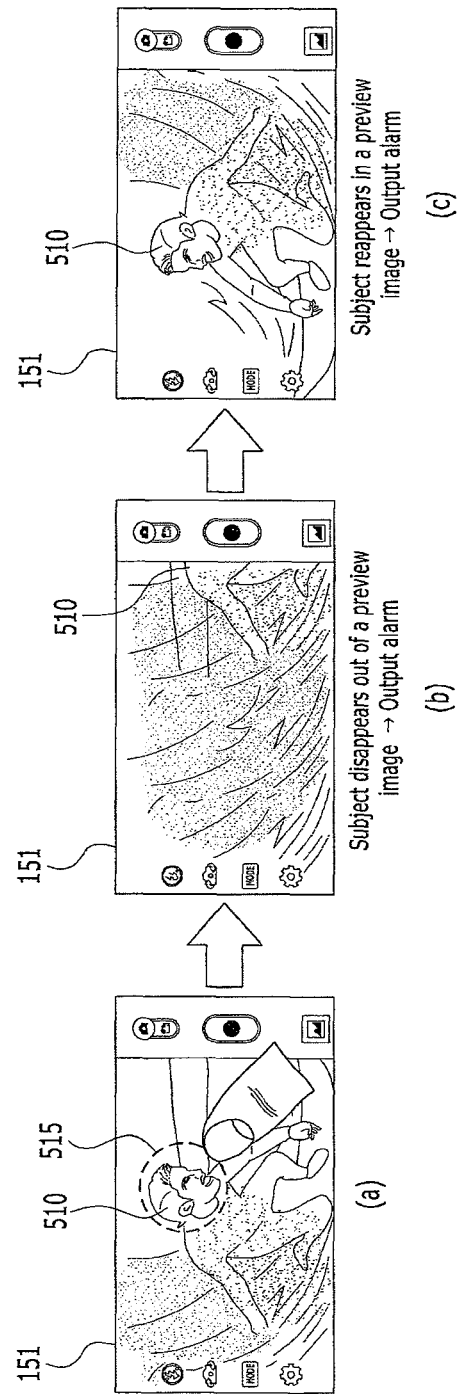

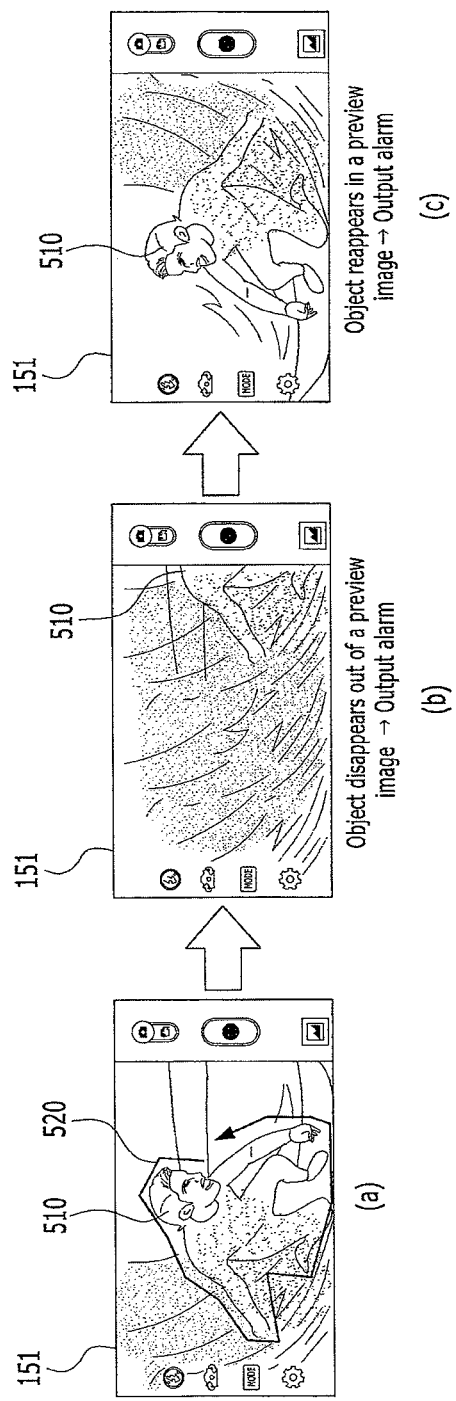

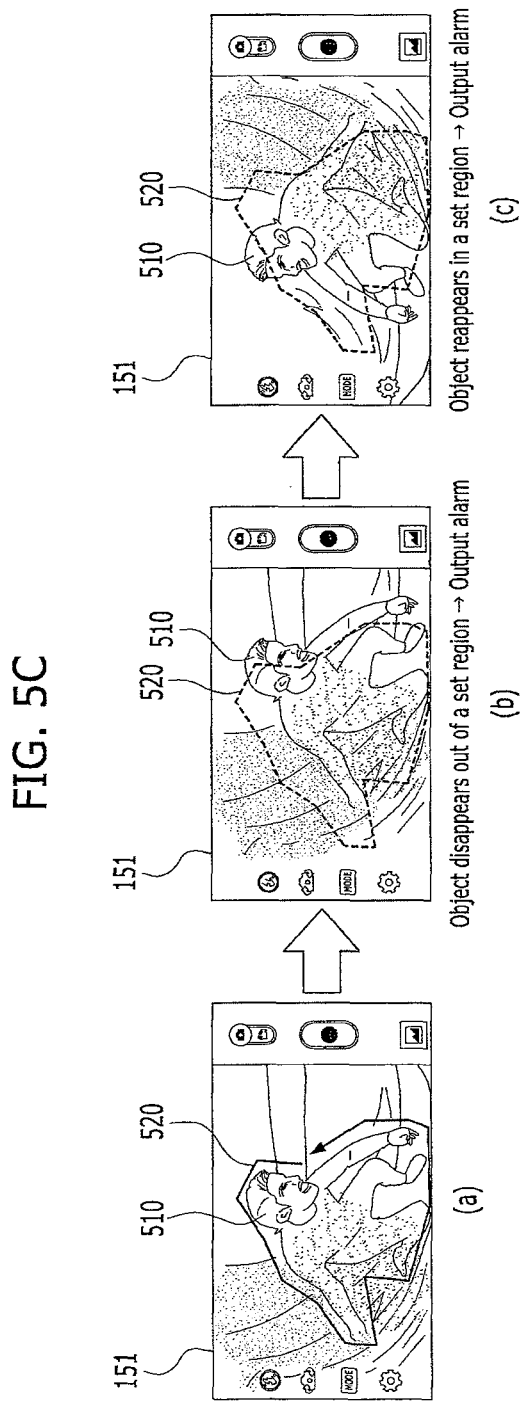

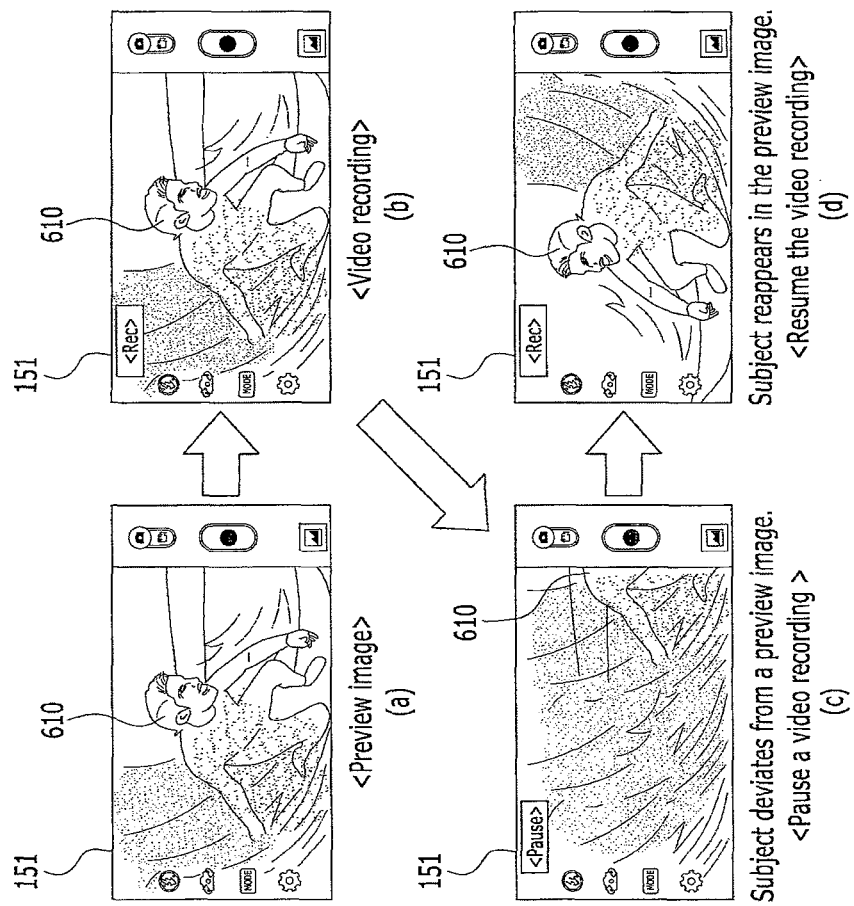

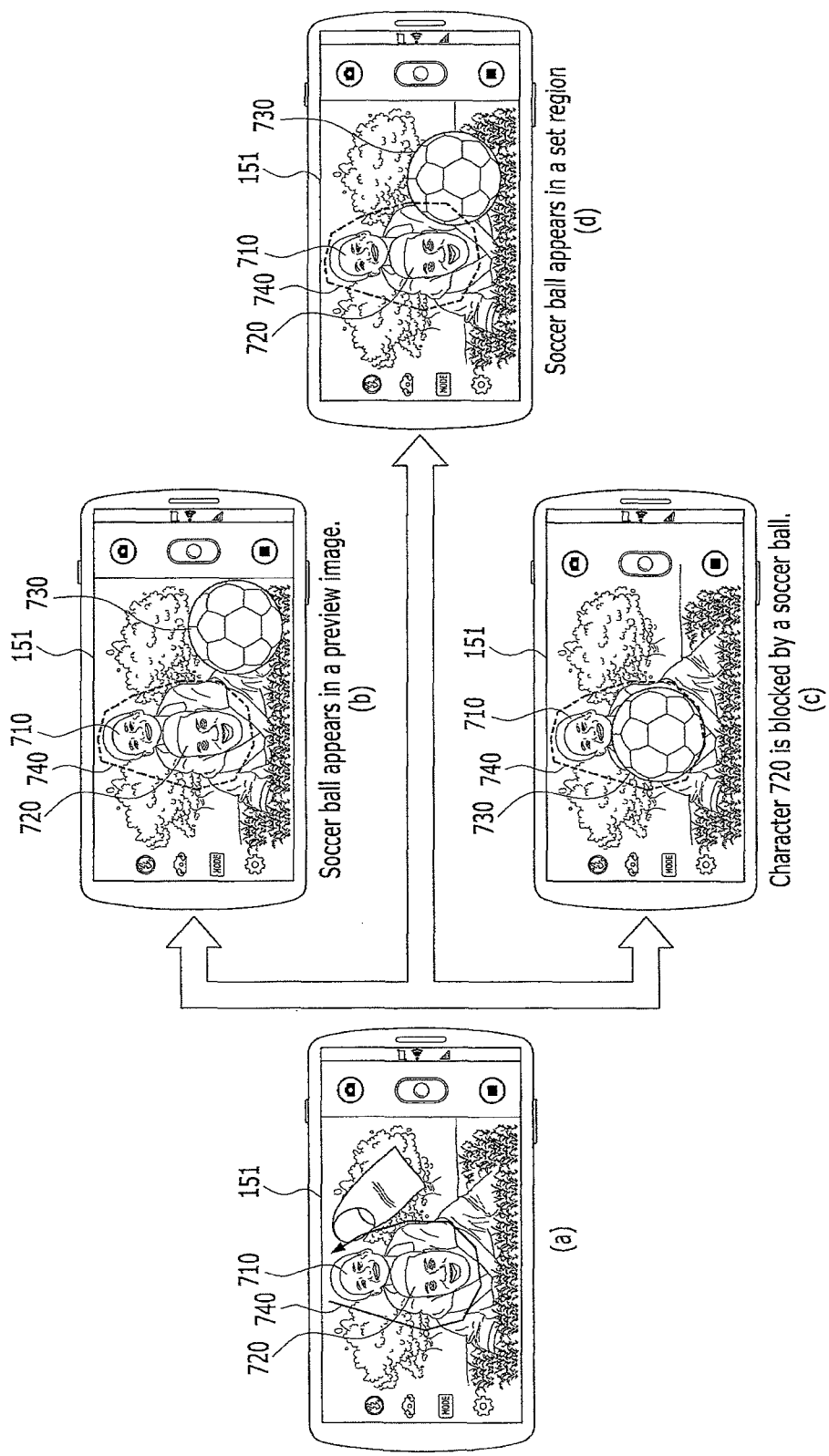

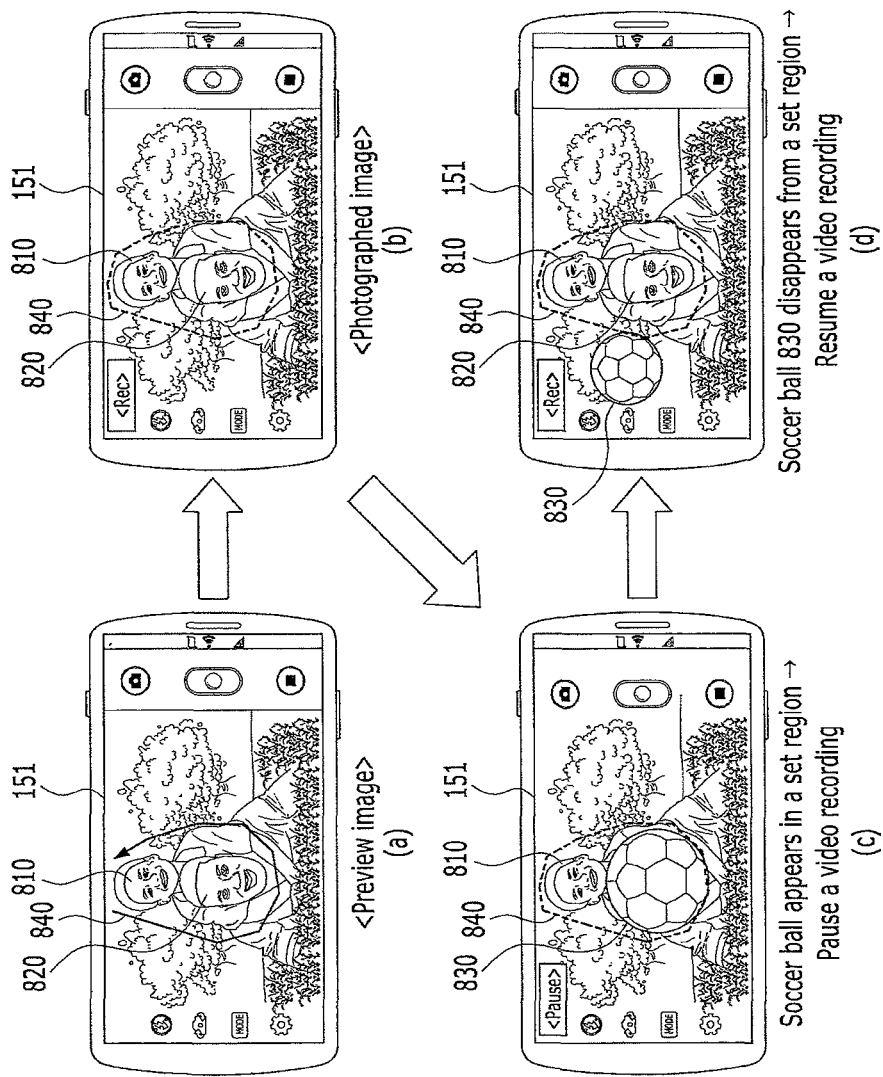

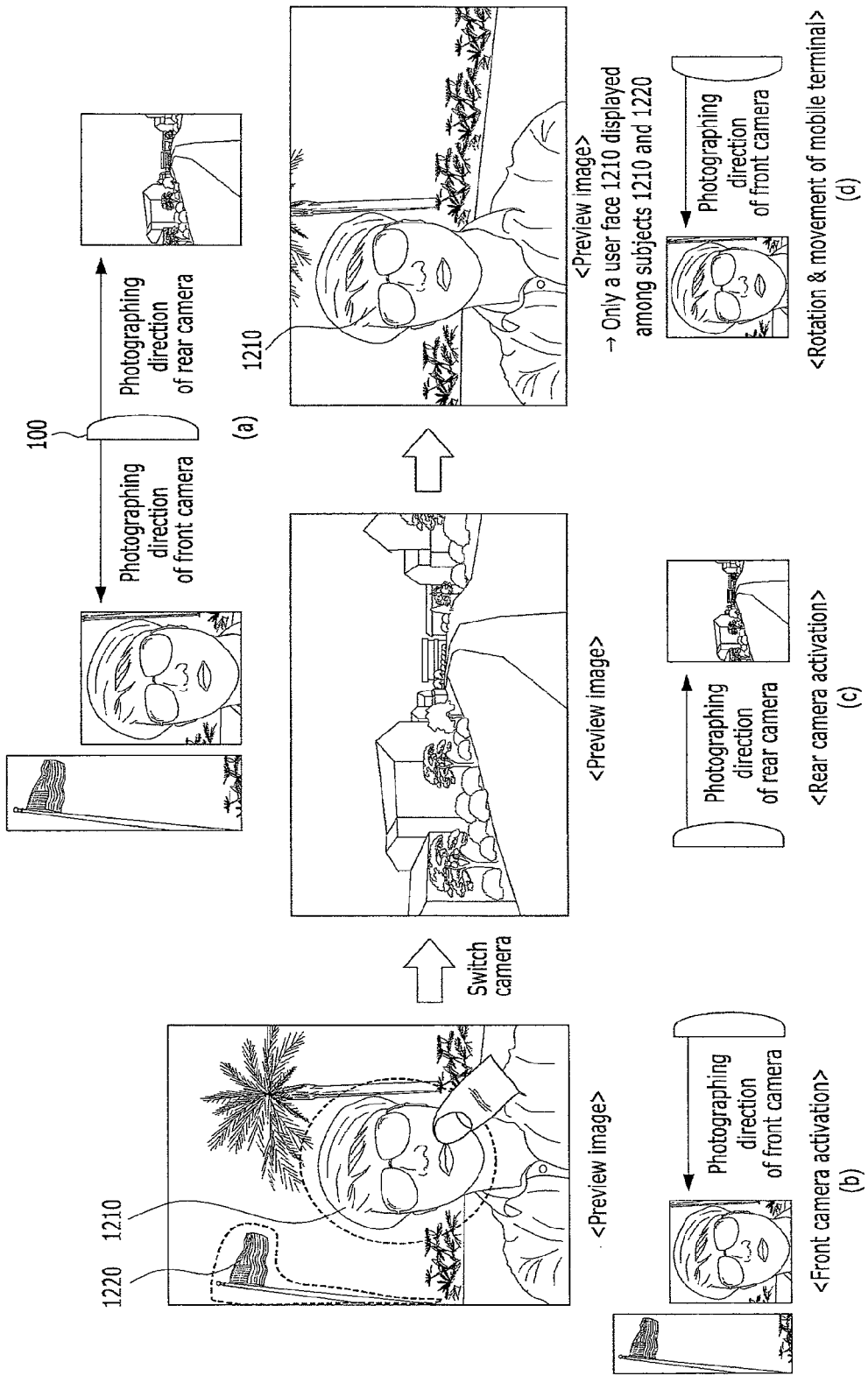

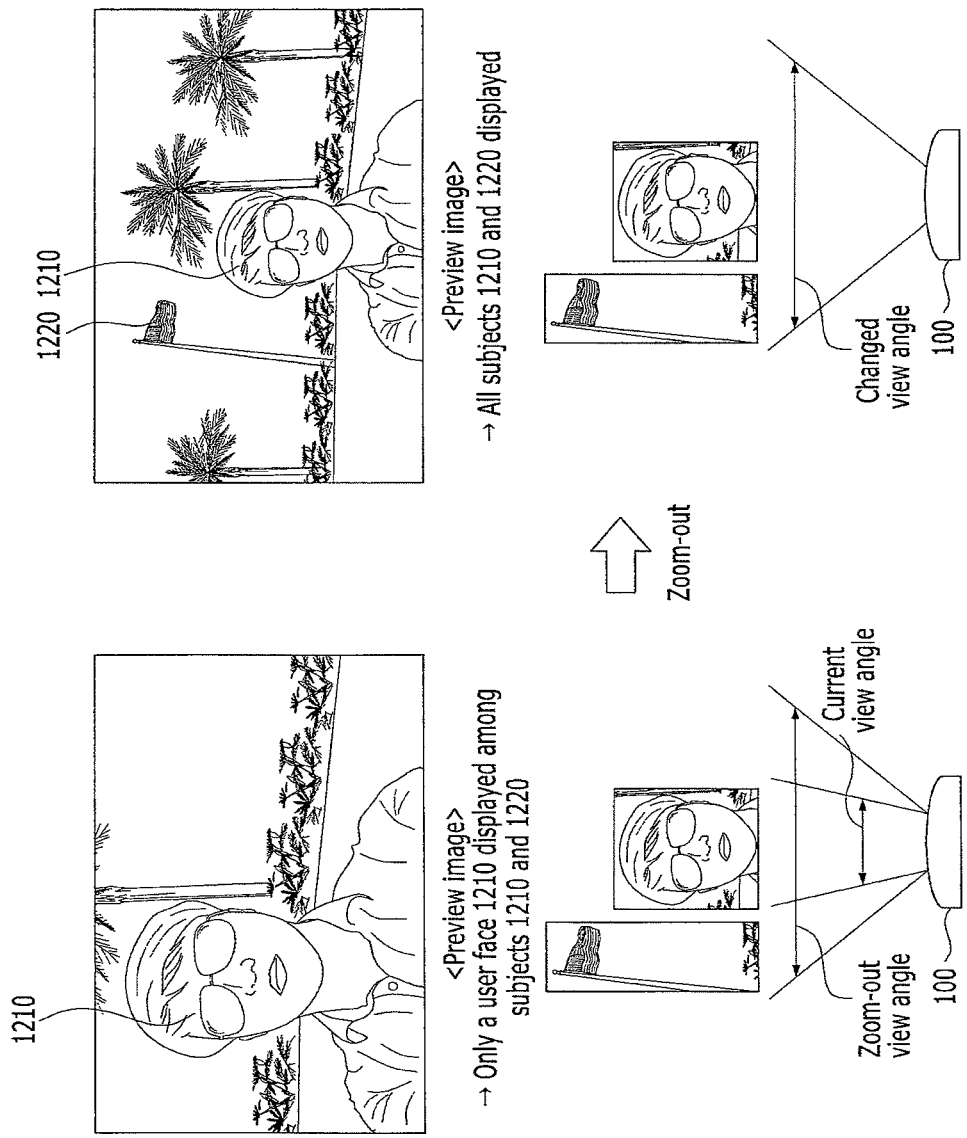

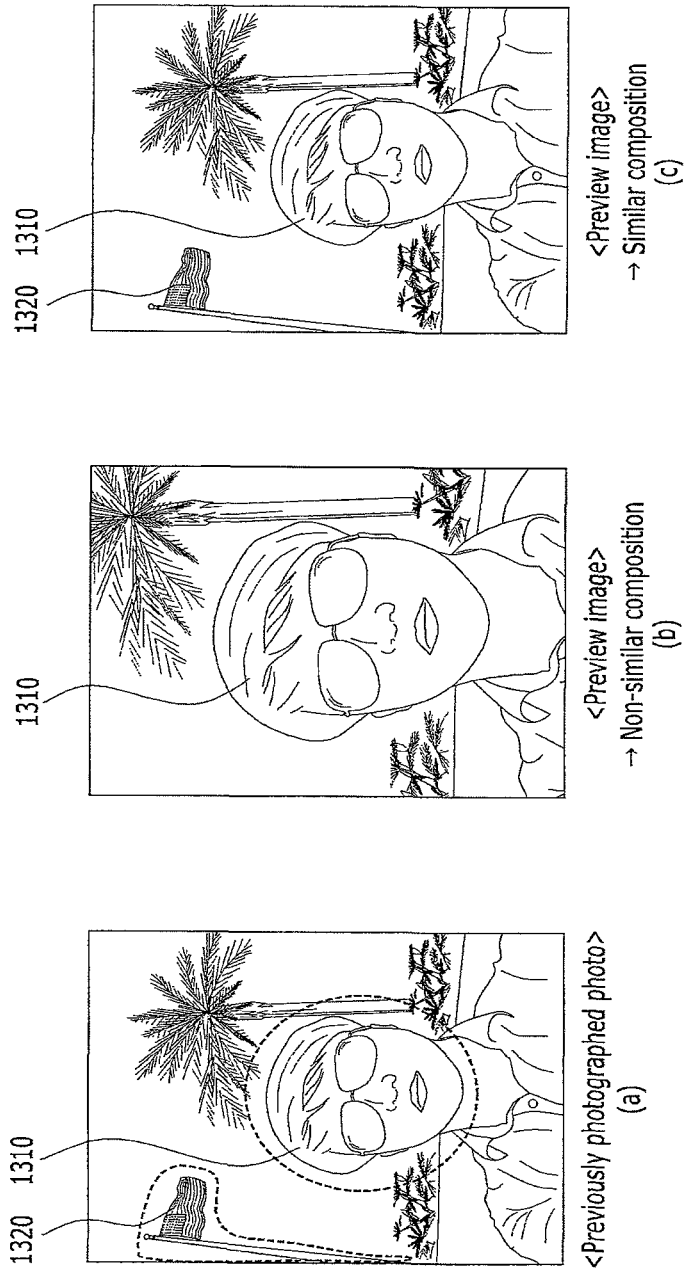

MOBILE TERMINAL AND CONTROLLING METHOD THEREOF

Pursuant to 35 U.S.C. §119(a), this application claims the benefit of earlier filing date and right of priority to Korean Application No. 10-2014-0059098, filed on May 16, 2014, the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for outputting an alarm when a subject deviates from a preview image.

2. Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components. Particularly, as mentioned in the foregoing description, a user can photograph an image (e.g., a photo, a video, etc.) desired to be recorded through a mobile terminal. Further, if a camera of the mobile terminal is activated for the photographing, the mobile terminal can output a preview image of a target, which is desired to be photographed by the user, through a display unit. And, the user can predict a photo or video, which is to be photographed, through the preview image.

Further, if a front camera exposed in the same direction of a display unit is activated, a user can easily check whether a subject of interest deviates from a preview image while watching the display unit. However, if a rear camera exposed in a direction opposite to that of the display unit is activated, since a user is unable to watch the display unit, it is difficult for the user to check whether the subject of interest deviates from the preview image. Thus, although a photo or video is photographed, it may cause a problem that a user-interested subject may not be photographed correctly.

Moreover, while a photo or video is photographed, when a person or object passes through, if a subject is blocked by the person or object, a user may not be able to interrupt the photographing despite confirming it through a preview screen or a currently photographed screen. Thus, the subject may not be photographed correctly. After the photographing, the user needs to additionally perform a correction processing for removing the blocking.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an alarm can be outputted in case of deviation of a subject from a preview image.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a camera, a display unit configured to display a preview image input through the camera, and a controller configured to select an object in the preview image in response to a user input for touching the object or setting a specific region comprising the object, and output an alarm when the object moves out from the preview image.

In another aspect of the present invention, as embodied and broadly described herein, a mobile terminal according to an embodiment of the present invention may include a camera, a display unit configured to display a preview image input through the camera, and a controller configured to extract an identification information of an object from a previously photographed photo, and if the extracted identification information of the object corresponds to the preview image input via the camera, control the camera to take a new photo automatically.

In further aspect of the present invention, as embodied and broadly described herein, a method of controlling a mobile terminal according to an embodiment of the present invention may include displaying a preview image input via a camera, selecting an object in response to a user input for touching the object or setting a specific region comprising the object, and output an alarm when the object moves out from the preview image.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 5A to 5C are diagrams illustrating one example to describe an operation of a mobile terminal when a selected subject or an object included in a selected region deviates from a preview image;

FIG. 6A and FIG. 6B are diagrams to describe an embodiment of interrupting a video recording and an embodiment of resuming the interrupted video recording;

FIG. 7A and FIG. 7B are diagrams to describe an operation of a mobile terminal when appearance of a new object;

FIG. 8A and FIG. 8B are diagrams to describe an embodiment of interrupting a video recording and an embodiment of resuming the interrupted video recording;

FIGS. 12A to 12C are diagrams to describe another example of a photographing process using a first camera and a second camera according to an embodiment of the present invention;

FIG. 13 is a diagram to describe an embodiment of taking a photo having a composition similar to that of a previously taken photo according to an embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
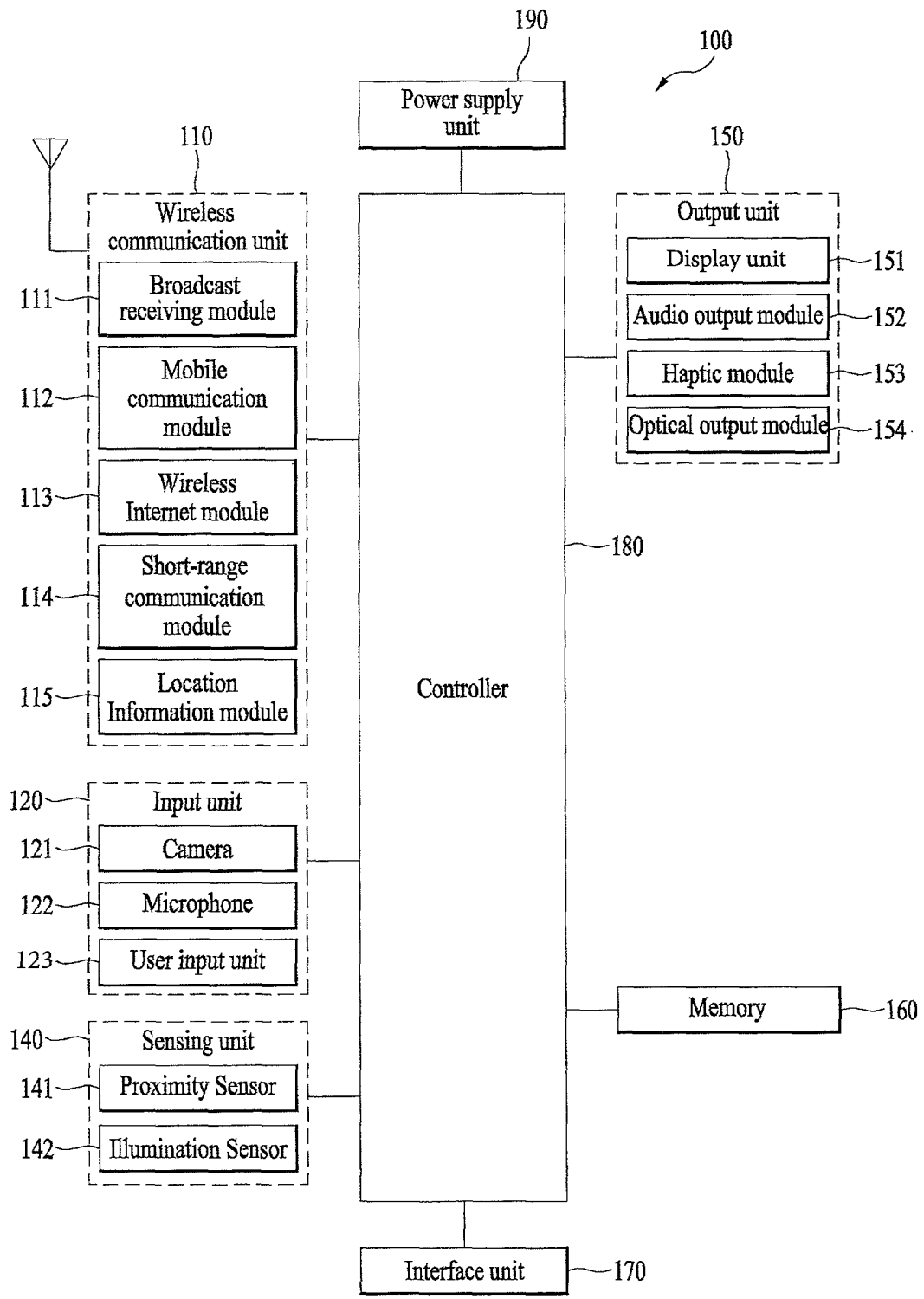
FIG. 1 is a block diagram of a mobile terminal in accordance with the present disclosure.
Figure 2:
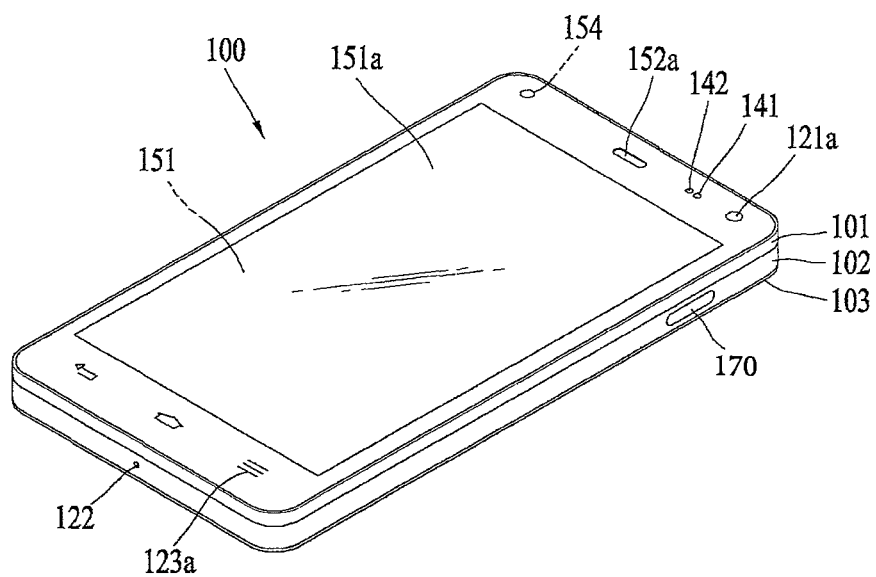
FIGS. 2 and 3 are conceptual views of one example of the mobile terminal, viewed from different directions.
Figure 3:
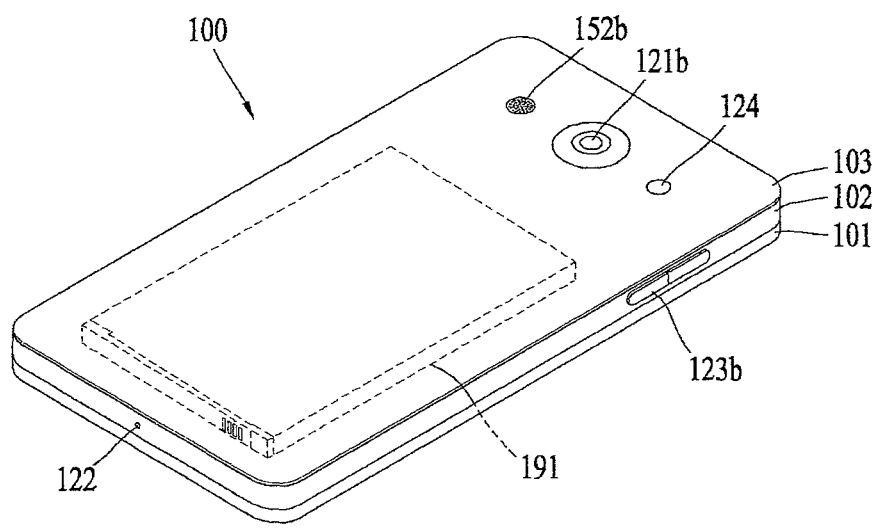

Reference is now made to FIGS. 1-3, where FIG. 1 is a block diagram of a mobile terminal in accordance with an embodiment of the present disclosure, and FIGS. 2 and 3 are conceptual views of one example of the mobile terminal, viewed from different directions. The mobile terminal 100 is shown having components such as a wireless communication unit 110, an input unit 120, a sensing unit 140, an output unit 150, an interface unit 170, a memory 160, a controller 180, and a power supply unit 190. Implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 170 serves as an interface with various types of external devices that can be coupled to the mobile terminal 100. The interface unit 170, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 170.

The memory 160 is typically implemented to store data to support various functions or features of the mobile terminal 100. For instance, the memory 160 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 160, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 160. As one example, the controller 180 controls some or all of the components illustrated in FIGS. 1-3 according to the execution of an application program that have been stored in the memory 160.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112. The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 160. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 160. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 170 serves as an interface for external devices to be connected with the mobile terminal 100. For example, the interface unit 170 can receive data transmitted from an external device, receive power to transfer to elements and components within the mobile terminal 100, or transmit internal data of the mobile terminal 100 to such external device. The interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 170.

When the mobile terminal 100 is connected with an external cradle, the interface unit 170 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 160 can store programs to support operations of the controller 180 and store input/output data (for example, phonebook, messages, still images, videos, etc.). The memory 160 may store data related to various patterns of vibrations and audio which are output in response to touch inputs on the touch screen. The memory 160 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 160 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 170 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface. If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2 and 3 depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a. The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 160.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 170 may serve as a path allowing the mobile terminal 100 to interface with external devices. For example, the interface unit 170 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 170 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121. If desired, second camera 121 may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 3, a flash 124 is shown adjacent to the second camera 121b. When an image of a subject is captured with the camera 121b, the flash 124 may illuminate the subject. As shown in FIG. 3, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 170. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present specification, a preview image may include an image input through the camera 121 of the mobile terminal 100 by a user manipulation. Moreover, as a preview image is displayed through the display unit 151, a user can preview a photo to take before taking the photo or a video to record before recording the video. While a preview image is displayed, if a photograph command is input, the controller 180 can take a photo or record a video.

In the present specification, a subject may mean a photographing target in which a user is interested. A subject may be set to a character, an animal, a thing, or the like. Further, a subject can be set to a face, a part of a body, a part of a thing, or the like. In the present specification, an object may mean a character, an animal, a thing or the like included in a user-set area. And, a face, a part of a body, a part of a thing or the like can mean an object.

A terminology 'camera' used in the following embodiments may indicate at least one of the front camera 121a exposed to a front side of the mobile terminal 100 and the rear camera 121b exposed to a rear side of the mobile terminal 100. Yet, in describing embodiments for which the front camera 121a and the rear camera 121b need to be distinguished from each other, a terminology 'first camera' and a terminology 'second camera' may be used. In particular, each of the first camera and the second camera may indicate the front camera 121a or the rear camera 121b.

In the following description, embodiments relating to a controlling method implemented in the above-configured mobile terminal shall be explained with reference to the accompanying drawings. In particular, FIG. 4 is a flowchart for an operation of a mobile terminal according to an embodiment of the present invention.

Figure 4:
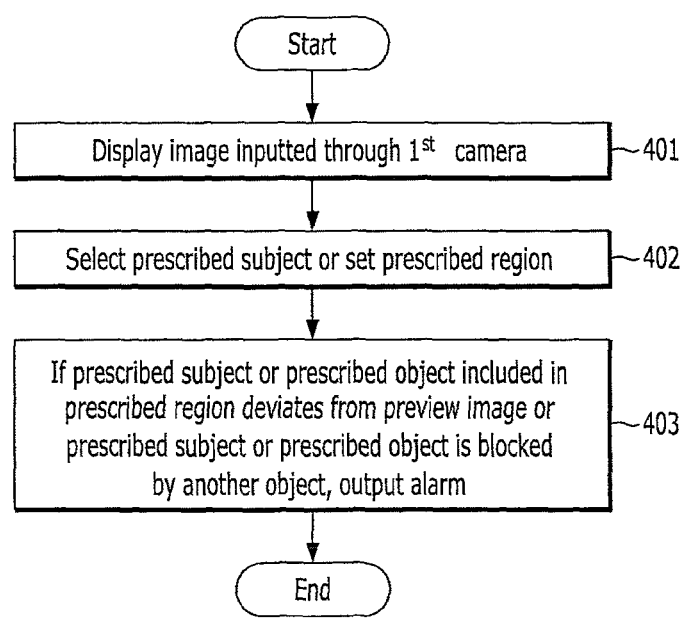
FIG. 4 is a flowchart for an operation of a mobile terminal according to an embodiment of the present invention.

Referring to FIG. 4, if the camera 121 is activated by a user manipulation, the controller 180 can control a preview image, which is input through the camera 121, to be displayed on the display unit 151 (S401). While the preview image is displayed, a prescribed subject is selected from the preview image or a prescribed region may be set in the preview image (S402). In this instance, if the prescribed subject or a prescribed object included in the prescribed region deviates from the preview image or the prescribed subject or the prescribed object is blocked by another object, the controller 180 can control an alarm to be output (S403).

FIGS. 5A to 5C are diagrams illustrating one example to describe an operation of a mobile terminal when a selected subject or an object included in a selected region deviates from a preview image. In particular, FIG. 5A is a diagram to describe an operation when a selected subject deviates from a preview image. And, FIG. 5B is a diagram to describe an operation when an object included in a selected region deviates from a preview image.

Referring to FIG. 5A (a), based on a user's touch input to a preview image, the controller 180 can select a specific subject within the preview image. According to the example shown in FIG. 5A (a), a user input of touching a surfer 510 is received. Further, the controller 180 can control the selected subject within the preview image to become visually identifiable. According to the example shown in FIG. 5A (a), in order to identify a surfer touched by a user, a dotted outline 515 is displayed on the surfer. However, a method of visually identifying a selected subject is non-limited by the method shown in FIG. 5A (a). Hence, a selected subject can be visually identified by a method different from that shown in FIG. 5A (a).

According to the example shown in FIG. 5A (a), a user input for selecting a subject is an input of touching a subject in a preview image, by which a user input for selecting a subject is non-limited. For instance, by a separate menu input, an input of a hard key manipulation or the like, a preview image subject can be selected. If a subject is selected, the controller 180 can detect such a change of the subject as a movement, an enlargement, a reduction, or the like.

The controller 180 can automatically select a subject in a preview image. For instance, if such an object as a character, an animal, a shape-recognizable article or the like is discovered from a preview image, the controller 180 can select the discovered object as a subject.

Referring to FIG. 5A (b), as the subject 510 selected from the preview image moves in a right direction, if at least one portion of the subject 510 deviates from the preview image, the controller 180 can control an alarm to be output through the mobile terminal 100. In this instance, the alarm may include at least one of an audio output through the audio output unit 152, a vibration output through the haptic module 153, and a light emitting from a light source (e.g., LED, etc.).

Further, the controller 180 can determine a center of the alarm output by chasing a direction in which the subject 510 disappears. For instance, when the alarm output is a vibration 520, like the example shown in FIG. 5A (b), if the subject 510 deviates in a right direction of the preview image, the controller 180 can control a stronger vibration 520 to be output from a right side of the mobile terminal 100. When the alarm is an audio type, the controller 180 can control an audio to be output from a right side of the mobile terminal 100 only (i.e., an audio is output from a speaker located at the right side only). Alternatively, the controller 180 can control an audio to be output in a manner that an audio output from a right side is stronger than that output from a left side. When an alarm is a light type, the controller 180 can control a light to be output from a right side of the mobile terminal 100 only. Alternatively, the controller 180 can control light output from a right side to be stronger than that output from a left side. Moreover, the controller 180 can adjust a strength or count of an alarm output in accordance with an extent that the subject 510 deviates from the preview image.

After the subject 510 has deviated from the preview image completely, like the example shown in FIG. 5A (c), if the subject reappears in the preview image, the controller 180 can control an alarm to be output through the mobile terminal 100. The alarm output in response to the reappearance of the subject 510 in the preview image may have a pattern different from that of the former case that the at least one portion of the subject 510 deviates from the preview image.

According to the example shown in FIG. 5A, a single subject is selected in response to a user's touch input. Moreover, the controller 180 can select a plurality of subjects from a preview image. Further, if a prescribed one of a plurality of the subjects deviates from the preview image or all the subjects deviate from the preview image, the controller 180 can control an alarm to be output.

Referring to FIG. 5B (a), based on a user's touch input to a preview image, the controller 180 can select a specific region within the preview image. For instance, if a touch input of dragging a pointer by chasing a trace of a closed curve on the preview image is received from the user, the controller 180 can select a region in a space formed by the closed curve as the specific region 520. According to the example shown in FIG. 5B (a), a user input of dragging a pointer by chasing a trace enclosing a circumference of a surfer 510 is selected. Further, as mentioned in the foregoing description with reference to FIG. 5A, the controller 180 can control the selected region to become visually identifiable.

According to the example shown in FIG. 5B (a), a user input for setting a specific region is an input of a touch for dragging a closed curve with a pointer on a preview image, by which a user input for setting a specific region is non-limited. For instance, by a separate menu input, an input of a hard key manipulation or the like, a specific region in a preview image can be set. If the specific region is set, the controller 180 can detect such a change of an object, which is included in the specific region, as a movement, an enlargement, a reduction, or the like. According to the example shown in FIG. 5A (a), the surfer 510 is included in the set specific region 520. Hence, the controller 180 can detect such a change of the surfer 510 as a movement, an enlargement, a reduction, or the like.

As the object 510 included in the set region moves in a right direction, like the example shown in FIG. 5B (b), if at least one portion of the object 510 deviates from the preview image, the controller 180 can control an alarm to be output through the mobile terminal 100. In this instance, the alarm may include at least one of an audio output through the audio output unit 152, a vibration output through the haptic module 153, and a light emitting from a light source (e.g., LED, etc.). Moreover, as mentioned in the foregoing description with reference to FIG. 5A, a center of an alarm output can be adjusted by chasing a direction in which the object 510 disappears or a strength or count of the alarm output can be adjusted in accordance with an extent that the object 510 deviates from the preview image.

After the object 510 has deviated from the preview image completely, like the example shown in FIG. 5B (c), if the object 510 reappears in the preview image, the controller 180 can control an alarm to be output through the mobile terminal 100. The alarm output in response to the reappearance of the object 510 in the preview image may have a pattern different from that of the former case that the at least one portion of the object 510 deviates from the preview image.

According to the example shown in FIG. 5B, if the object 510 included in the set region 520 deviates from the preview image, the alarm is output. In another example, if the object 510 included in the set region 520 deviates from the preview image, the controller 180 can control the alarm to be output.

For instance, FIG. 5C is a diagram to describe an operation of a mobile terminal if an object included in a set region deviates from the set region. Referring to FIG. 5C (a), a region 520 including a surfer 510 is set by a user's touch input for example. Thereafter, as the object 510 included in the set region 520 moves in a right direction, like the example shown in FIG. 5C (b), if the object 510 deviates from the set region 520, the controller 180 can control an alarm to be output through the mobile terminal 100.

After the object 510 has deviated from the set region 520 completely, like the example shown in FIG. 5C (c), if the object 510 reappears in the set region 520, the controller 180 can control an alarm to be output through the mobile terminal 100. The alarm output in response to the reappearance of the object 510 in the set region 520 may have a type or pattern different from that of the former case that the at least one portion of the object 510 deviates from the set region 520.

According to the examples shown in FIG. 5B and FIG. 5C, a single region is set in response to a user's touch input.

Furthermore, the controller 180 can set a plurality of regions in a preview image. In this instance, if at least one of objects included in each of the regions deviates from the preview image or each of the regions or all the objects included in each of the regions deviate from the preview image or each of the regions, the controller 180 can output an alarm.

Meanwhile, if a subject does not deviate from a preview image for a preset time or an object included in a set region does not deviate from a preview image or the set region, the controller 180 can control a photo or video to be photographed automatically. Yet, although the above-mentioned condition is met, if a new object appears in the preview image or the set region and the new object blocks the subject or the object included in the set region, a photo or video may not be photographed. In this instance, the preset time may be determined by a user's or manufacturer's setting.

The embodiments described with reference to FIGS. 5A to 5C can be applied to a case of making a video. In particular, while a video is made, if at least one portion of a previously selected subject or at least one portion of an object included in a preset region deviates a photographed image or the preset region, the controller 180 can control an alarm to be output through the mobile terminal 100.

Moreover, while a video is made, if at least one portion of a subject or at least one portion of an object deviates a photographed image or a preset region, the controller 180 can control the video recording to be interrupted. This is described in detail with reference to FIG. 6A and FIG. 6B as follows.

Figure 6B:
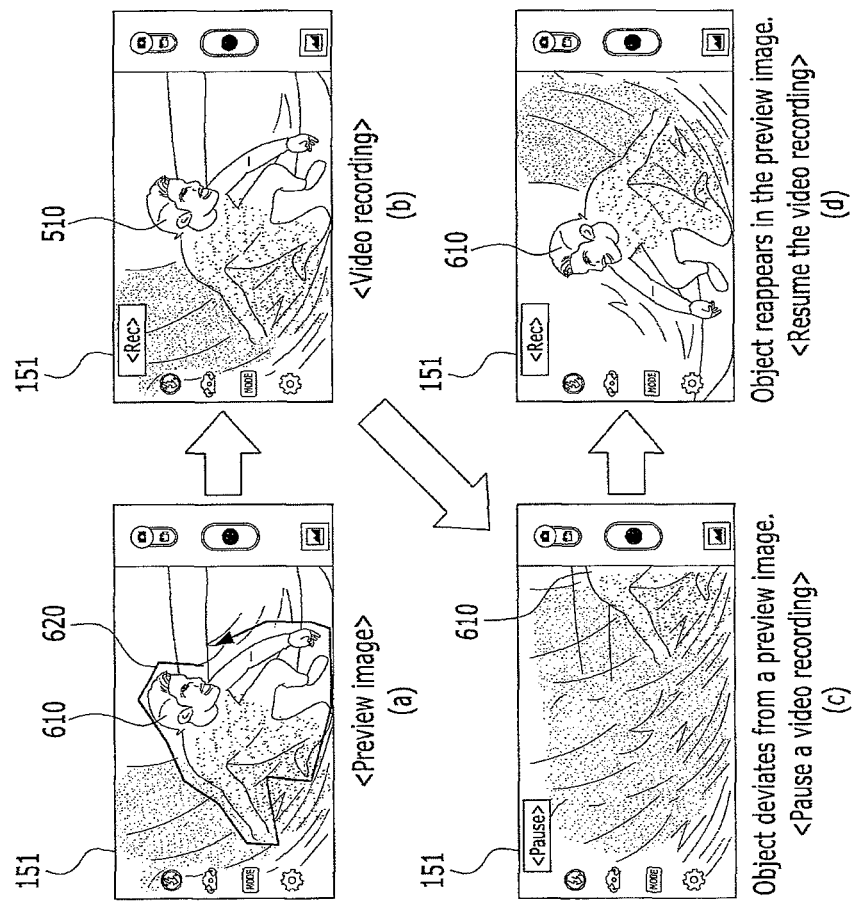

FIG. 6A and FIG. 6B are diagrams to describe an embodiment of interrupting a video recording and an embodiment of resuming the interrupted video recording. Referring to FIG. 6A (*a*), based on a touch input to a preview image, the controller 180 can select a specific subject 610 in the preview image. According to the example shown in FIG. 6A (*a*), a user input of touching a surfer 610 is received. Thereafter, if a user input for a video photographing is received, referring to FIG. 6A (*b*), the controller 180 records an input image and can also control a photographed image to be output through the display unit 151.

Further, as the selected subject moves before the video photographing, if at least one portion of the subject 610 deviates a photographed image, referring to FIG. 6A (*c*), the controller 180 can control a recording of a video to be interrupted. When the controller 180 interrupts the video recording, the controller 180 can also control an alarm, which is provided to notify that the subject 610 has deviated from the photographed image, to be output.

Thereafter, if the subject 610 reappears in the photographed image, referring to FIG. 6A (*d*), the controller 180 can resume the video recording. Further, the controller 180 can control an alarm, which is provided to notify that the video recording is resumed, to be output.

Referring to FIG. 6B (*a*), based on a touch input to a preview image, the controller 180 can set a specific region 620 in the preview image. According to the example shown in FIG. 6B (*a*), the region 620 is set to enclose a surfer 610. Thereafter, if a user input for a video photographing is received, referring to FIG. 6B (*b*), the controller 180 records an image input through the camera 121 and can also control a photographed image to be output through the display unit 151.

Further, as the object 610 included in the set region 620 moves before the video photographing, if at least one portion of the object 610 deviates a photographed image, referring to FIG. 6B (*c*), the controller 180 can control a recording of a video to be interrupted. When the controller 180 interrupts the video recording, the controller 180 can also control an alarm, which is provided to notify that the object 610 has deviated from the photographed image, to be output.

Thereafter, if the object 610 reappears in the photographed image, referring to FIG. 6B (*d*), the controller 180 can resume the video recording. Further, the controller 180 can control an alarm, which is provided to notify that the video recording is resumed, to be output. Besides, if the object 610 included in the set region deviates the set region 620, the controller 180 interrupts the video recording. Subsequently, if the object 610 reappears in the set region 620, the controller 180 can resume the video recording.

According to the examples shown in FIG. 6A and FIG. 6B, by applying a touch input to a preview region before a video photographing, it can select a subject or set a specific region. Unlike the examples shown in FIG. 6A and FIG. 6B, during a video photographing, the controller 180 can select a subject or set a specific region.

In the following description, when a new object appears in a preview image or a set region, an operation of a mobile terminal is explained in detail with reference to the accompanying drawings. In particular, FIG. 7A and FIG. 7B are diagrams to describe an operation of a mobile terminal for appearance of a new object.

Figure 7A:
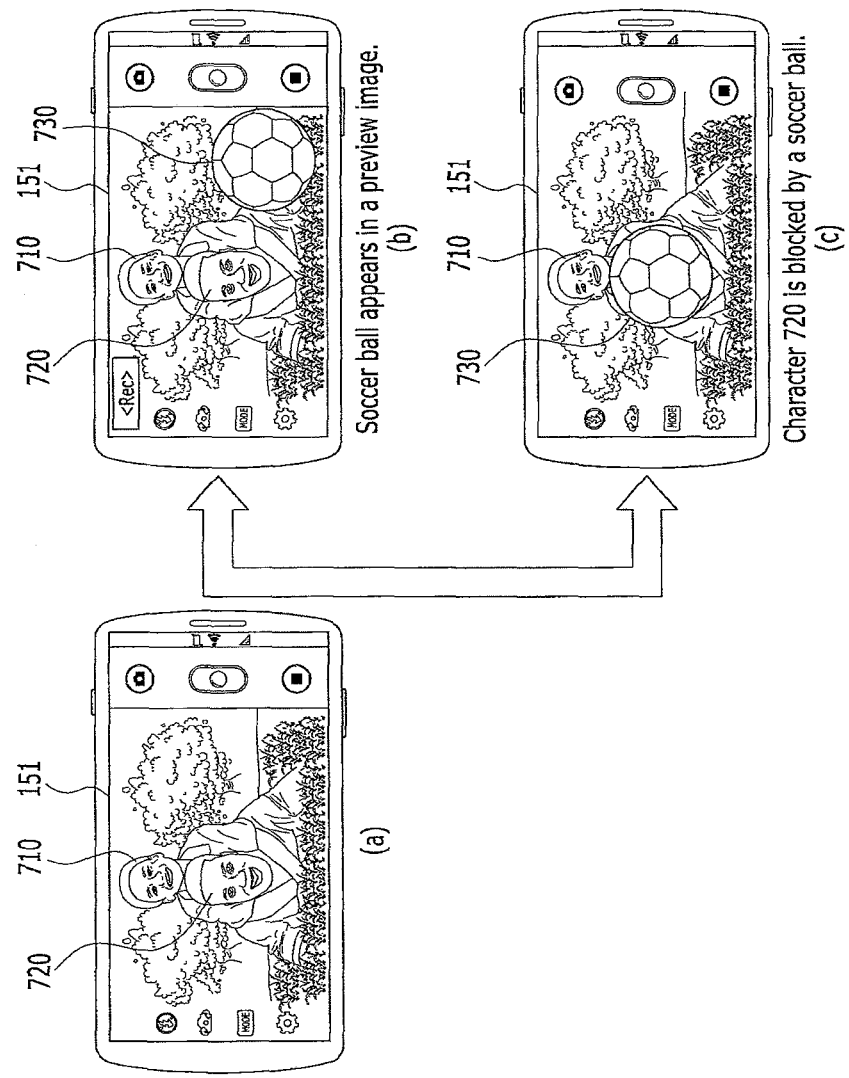

Referring to FIG. 7A, two characters 710 and 720 are selected as subjects for example (FIG. 7A (*a*)). If a new object (e.g., a soccer ball) 730 appears in a preview image (FIG. 7A (*b*)) or a new object 730 appearing in a preview image blocks at least one portion (e.g., the character indicated by a reference number 720 is blocked in FIG. 7A) of the selected subjects (FIG. 7A (*c*)), the controller 180 can control an alarm to be output through the mobile terminal 100. In this instance, the alarm may include at least one of an audio output through the audio output unit 152, a vibration output through the haptic module 153, and a light emitting from a light source (e.g., LED, etc.).

Further, the controller 180 can determine a center of the alarm output by chasing a direction in which the new object 730 moves. For instance, when the alarm output is a vibration, if the new object 730 moves in a right direction of the preview image from a left direction, the controller 180 controls a vibration stronger than that of a right side to be output from a left side of the mobile terminal 100. Subsequently, if the new object 730 moves toward a right side of the preview image, the controller 180 can control the vibration strength deviation between the left side and the right side to be decreased gradually. Moreover, the controller 180 can adjust a strength or count of an alarm output in accordance with an extent that the number or size of the new object(s) 730 appearing in the preview image.

Referring to FIG. 7B, two characters 710 and 720 are included in a set region 740 for example (FIG. 7B (*a*)). If a new object 730 appears in a preview image (FIG. 7B (*b*)) or a new object 730 appearing in a preview image blocks at least one portion of objects included in the set region 740 (e.g., the character indicated by a reference number 720 is blocked in FIG. 7B (*b*)) (FIG. 7B (*c*)), the controller 180 can control an alarm to be output through the mobile terminal 100.

Referring to FIG. 7B (*d*), if a new object 730 appears in the set region 740, the controller 180 can control an alarm to be output through the mobile terminal 100. The embodiments described with reference to FIG. 7A and FIG. 7B can be applied to a case of making a video. In particular, while a video is made, if a new object appears in a photographed image or an object newly appearing in a photographed image blocks a previously selected subject or an object included in a preset region, the controller 180 can control an alarm to be output through the mobile terminal 100.

Moreover, while a video is made, if a new object appears in a photographed image or an object newly appearing in a photographed image blocks a previously selected subject or an object included in a preset region, the controller 180 can control the video recording to be interrupted. This is described in detail with reference to FIG. 8A and FIG. 8B as follows.

Figure 8A:
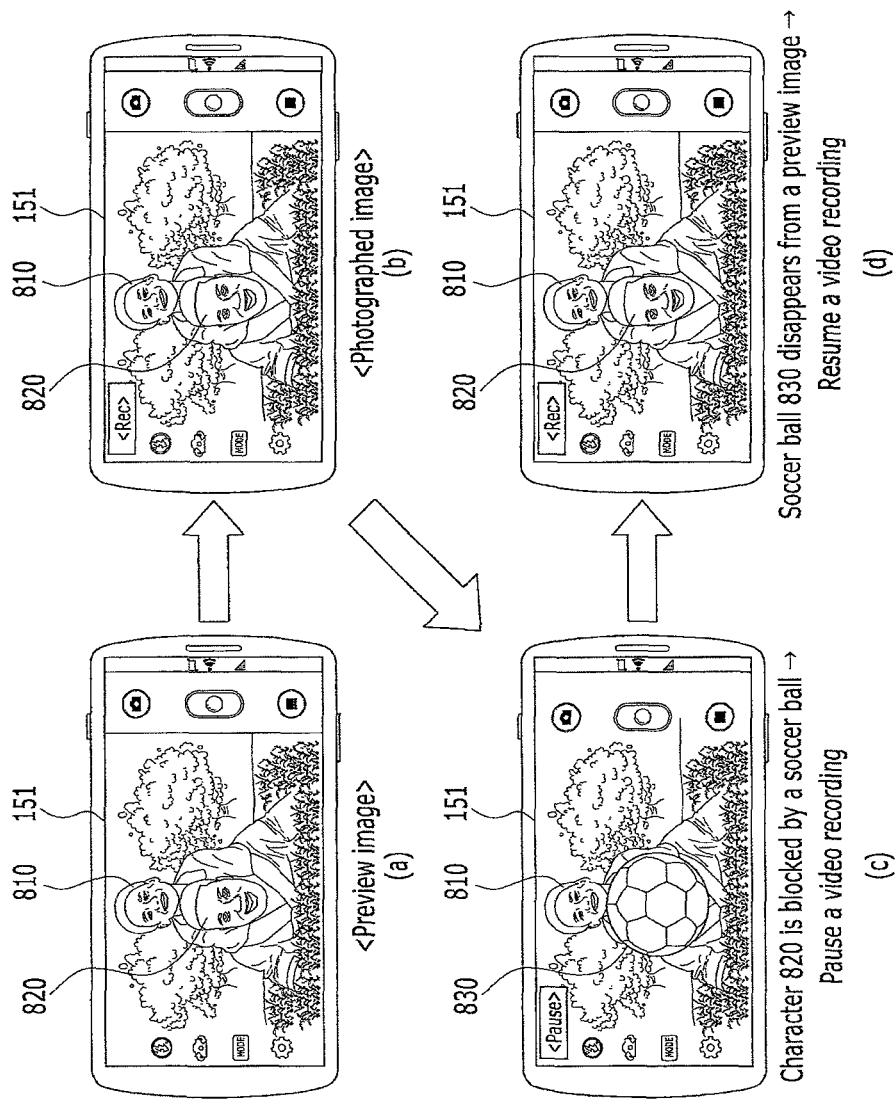

FIG. 8A and FIG. 8B are diagrams to describe an embodiment of interrupting a video recording and an embodiment of resuming the interrupted video recording. Referring to FIG. 8A (*a*), the controller 180 can select a specific subject in a preview image. According to the example shown in FIG. 8A (*a*), two characters 810 and 820 are selected as subjects. Subsequently, referring to FIG. 8A (*b*), if a user input for a video photographing is received, the controller 180 records an image input through the camera 121 and can also control a photographed image to be output through the display unit 151.

Subsequently, if a new object 830 appears in the photographed image or the newly appearing object 830 blocks at least one of the subjects 810 and 820, referring to FIG. 8A (*c*), the controller 180 can control a recording of a video to be interrupted. When the controller 180 interrupts the video recording, the controller 180 can control an alarm, which notifies the appearance of the new object 830, to be output as well.

Thereafter, referring to FIG. 8A (*d*), if the newly appearing object 830 disappears from the photographed image or does not block the corresponding subject(s), the controller 180 can resume the video recording. Further, the controller 180 can control an alarm, which notifies that the video recording is resumed, to be output.

Referring to FIG. 8B (*a*), based on a touch input to a preview image, the controller 180 can set a specific region in the preview image. According to the example shown in FIG. 8B (*a*), the region 840 is set to enclose two characters 810 and 820. Thereafter, if a user input for a video photographing is received, referring to FIG. 8B (*b*), the controller 180 records an image input through the camera 121 and can also control a photographed image to be output through the display unit 151.

Subsequently, if a new object 830 appears in the photographed image, the newly appearing object 830 blocks the object 810 or 820 included in the set region 840, or the new object 830 appears in the set region 840, referring to FIG. 8B (*c*), the controller 180 can control a recording of a video to be interrupted. When the controller 180 interrupts the video recording, the controller 180 can also control an alarm, which is provided to notify the appearance of the new object 830, to be output.

Thereafter, if the newly appearing object 830 disappears from the photographed image, the newly appearing object 830 does not block the object included in the set region 840, or the newly appearing object 830 deviates from the set region 840, referring to FIG. 8B (*d*), the controller 180 can resume the video recording. Further, the controller 180 can control an alarm, which is provided to notify that the video recording is resumed, to be output.

According to the examples shown in FIG. 8A and FIG. 8B, by applying a touch input to a preview region before a video photographing, it can select a subject or set a specific region. Unlike the examples shown in FIG. 8A and FIG. 8B, during a video photographing, the controller 180 can select a subject or set a specific region.

According to the description with reference to FIG. 8A and FIG. 8B, a case of currently recording a video through the mobile terminal 100 is taken as an example. Yet, the present embodiment is similarly applicable to a case for a user to photograph a still image. For instance, although the mobile terminal 100 receives a photographing command, if a new object appears in a preview image or the newly appearing object blocks a subject or an object included in a set region, it can control a photographing not to be performed. If the newly appearing object deviates from the preview image or the newly appearing object fails to block the subject or the object included in the set region anymore, the controller 180 can perform the photographing in response to the received photographing command.

The mobile terminal 100 according to an embodiment of the present invention moves a lens of the camera 121 by chasing a subject or an object included in a specific region or adjusts a zooming magnification. When the controller 180 is unable to further move the lens of the camera 121 or is unable to further adjust the zooming magnification, if the selected subject or the object included in the specific region deviates from the preview image, the mobile terminal 100 can control an alarm to be then output.

Figure 9:
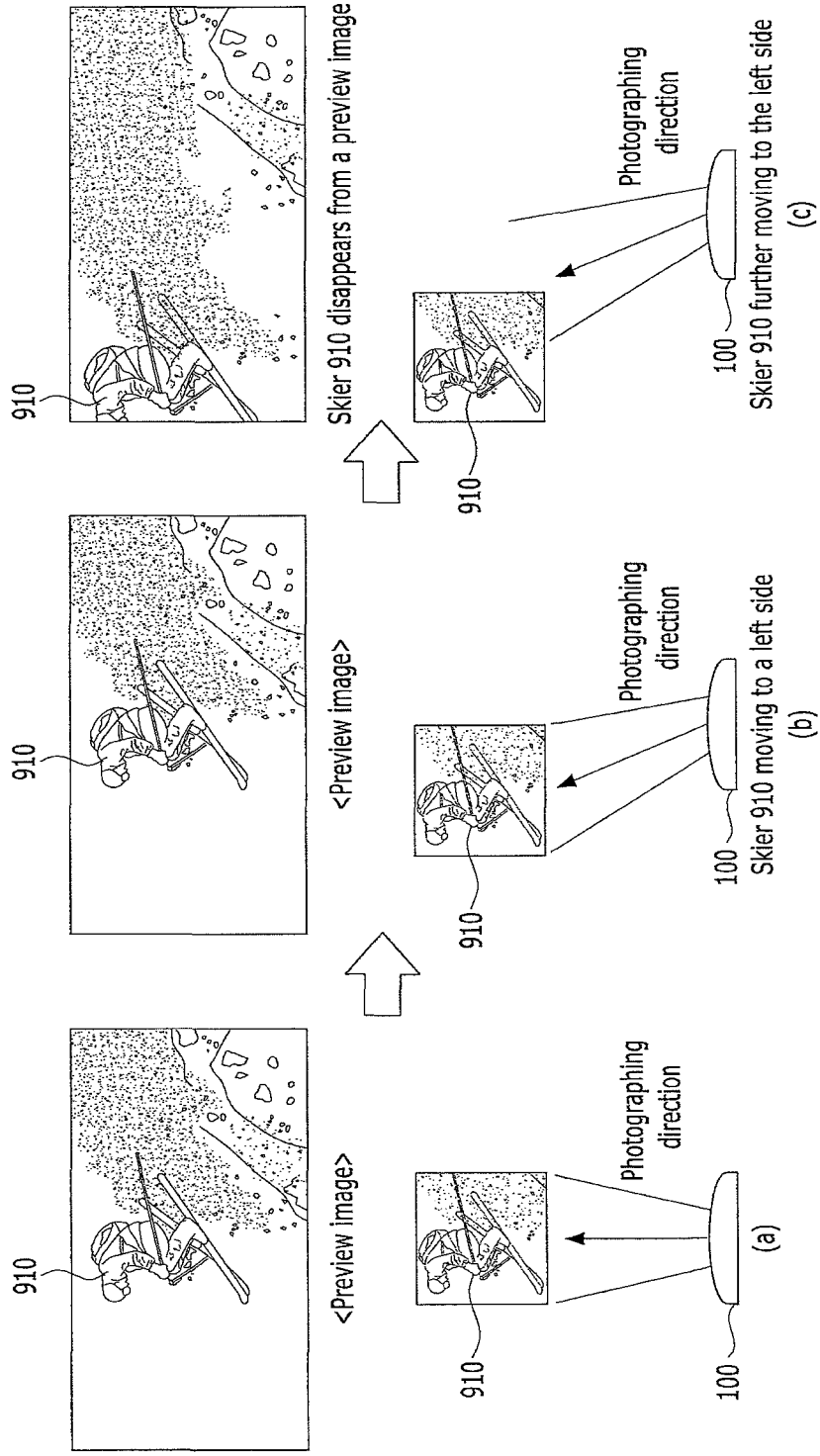
FIG. 9 is a diagram to describe one example of changing an angle of a camera lens by tracking a subject.

For instance, FIG. 9 is a diagram to describe one example of changing an angle of a camera lens by tracking a subject. For clarity of the following description, assume that a selected subject (or an object included in a set region) is a skier 910. Referring to FIG. 9, if a skier 910 moves from a right side to a left side (FIG. 9 (*a*)), the controller 180 can control an image of the skier 910 to keep being input by rotating a lens of the camera 121 to chase the skier 910 (FIG. 9 (*b*)).

Thereafter, despite that the lens of the camera 121 is rotated to the maximum, since the skier 910 keeps moving in a left direction, if at least one portion of the skier 910 disappears from the preview image, the controller 180 can control an alarm to be output through the mobile terminal 100. The embodiment described with reference to FIG. 9 can be applied to a case of rotating the lens of the camera 121 by chasing a subject (or an object included in a set region) in a photographed image during a video photographing.

Figure 10:
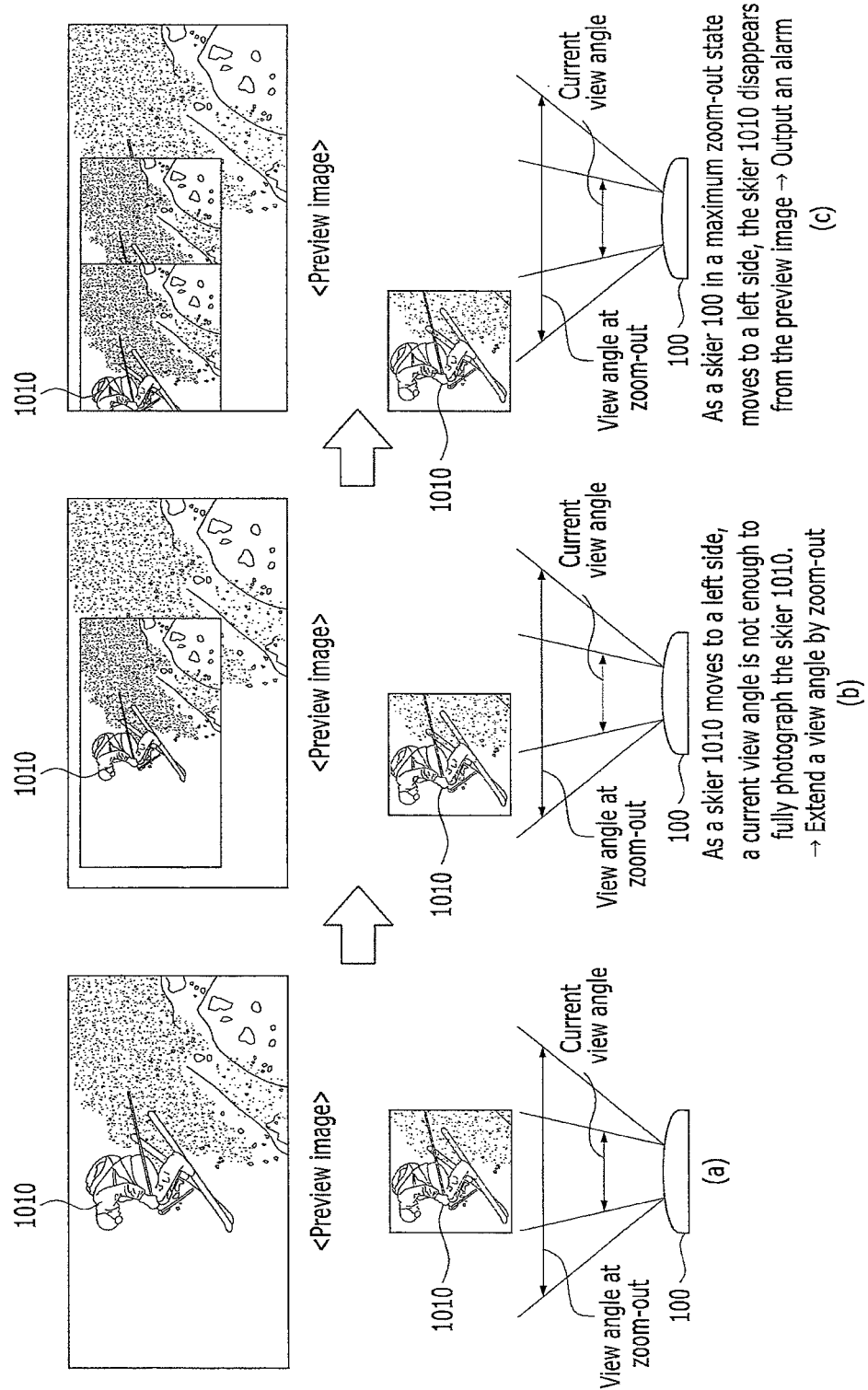
FIG. 10 is a diagram to describe one example of tracking a subject by zoom-in or zoom-out.

FIG. 10 is a diagram to describe one example of tracking a subject by zoom-in or zoom-out. For clarity of the following description, assume that a selected subject (or an object included in a set region) is a skier 910. Referring to FIG. 10 (*a*), as a skier 1010 moves, it may be unable to fully photograph the skier 1010 at a current view angle. In particular, at least one portion of the skier 1010 disappears from a view image corresponding to the current view angle.

In this instance, referring to FIG. 10 (*b*), the controller enlarges the view angle by zooming out the camera 121, thereby controlling the skier 1010 to be fully included in the preview image. Thereafter, referring to FIG. 10 (*c*), despite that the camera 121 is unable to further zoom out, since the skier 1010 further moves, if at least one portion of the skier 1010 disappears from the preview image, the controller 180 can control an alarm to be output through the mobile terminal 100.

In another example, when the skier 101 gets away from the camera 121, the controller 180 can control the camera 121 to zoom in in order to maintain a subject size at a predetermined level. After a subject has been selected from a preview image input through the first camera or a prescribed region has been set in the preview image, the first camera is deactivated and a user input for activating the second camera may be then received. If the subject selected from the preview image input through the first camera or an object included in the prescribed region is detected from a preview image input through the second camera, the controller 180 outputs an alarm and can then control a photo or video to be automatically photographed. This is described in detail with reference to FIG. 11 as follows.

Figure 11:
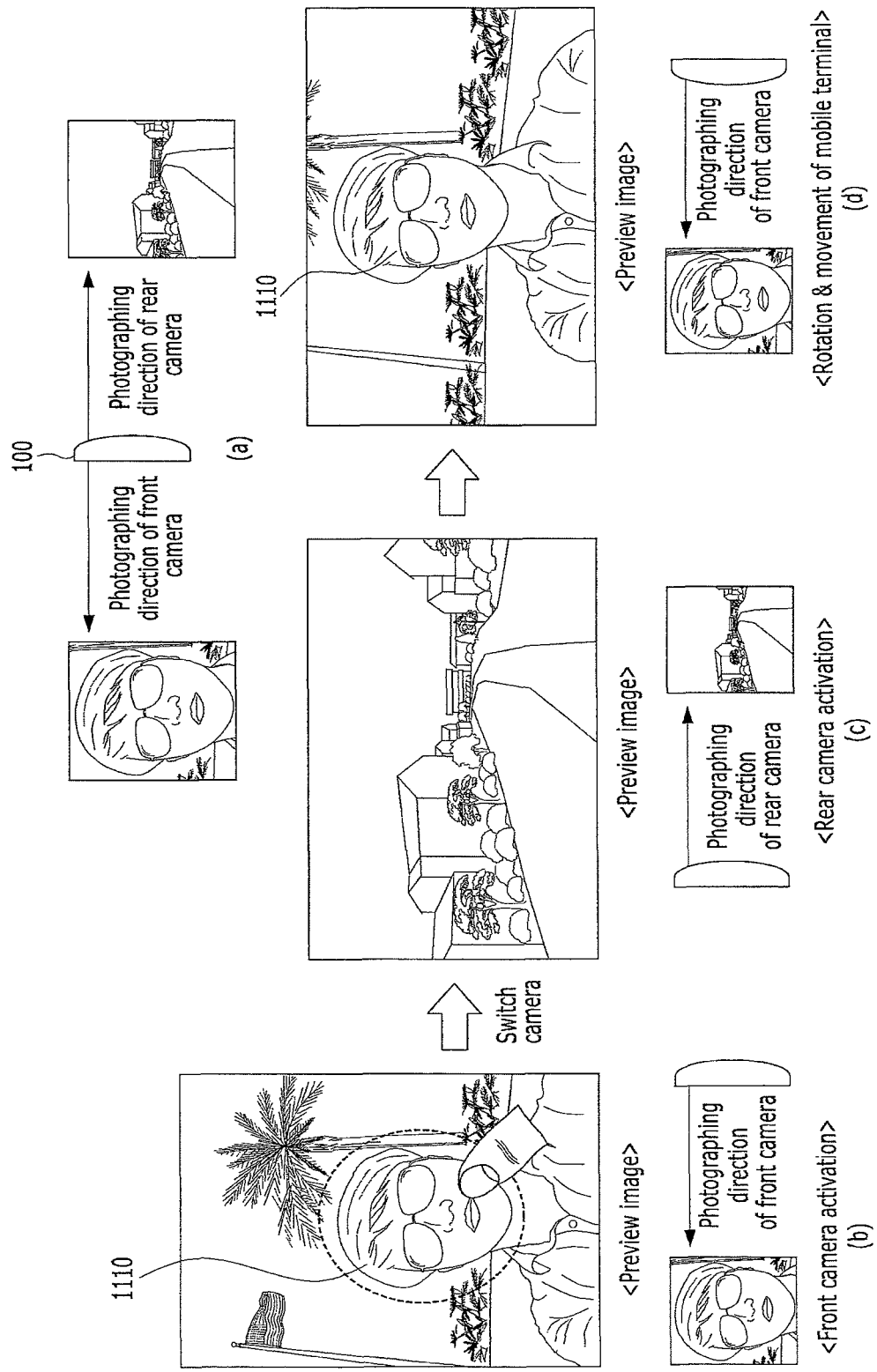
FIG. 11 is a diagram to describe one example of a photographing process using a first camera and a second camera according to an embodiment of the present invention.

FIG. 11 is a diagram to describe one example of a photographing process using a first camera and a second camera according to an embodiment of the present invention. For clarity of the following description, assume that a first camera and a second camera include the front camera 121a and the rear camera 121b, respectively. And, assume that the initial photographing directions of the front camera 121a and the rear camera 121b are set as shown in FIG. 11 (a). If the front camera 121a is activated, referring to FIG. 11 (b), the controller 180 can control a preview image, which is input through the front camera 121a, to be displayed through the display unit 151. Based on a user input to the preview image, the controller 180 can select a subject or set a prescribed region. For clarity of the description, like the example shown in FIG. 11 (b), assume that the selected subject or an object included in the prescribed region is a user's face 1110.

Subsequently, referring to FIG. 11 (c), if a user input for switching to the rear camera 121b is received, the controller 180 can control a preview image, which is input through the rear camera 121b, to be displayed through the display unit 151. In this instance, the user input unit for deactivating the front camera 121a and activating the rear camera 121b may include one of a gesture input, a touch input of touching a button on the display unit 151, a manipulation of a physical button provided to the mobile terminal, a voice command, and the like.

For instance, the user input unit for deactivating the front camera 121a and activating the rear camera 121b may include a gesture input of rotating the mobile terminal 100 over a prescribed angle (e.g., a gesture input of rotating the mobile terminal 100 at 180 degrees). In this instance, based on a detected signal of the sensing unit 140, the controller 180 can determine whether the mobile terminal 100 is rotated at an angle equal to or greater than the prescribed angle.

Referring to FIG. 11 (d), as the mobile terminal 100 is rotated or moved, if a user's face selected from the preview image of the front camera 121a is accidentally discovered from the preview image of the rear camera 121b, the controller 180 can control an alarm to be output through the mobile terminal 100. Thereafter, if the user's face 1110 does not deviate from the preview image of the rear camera 121b for a preset time, the controller 180 can control a photo or video to be automatically photographed.

The embodiment described with reference to FIG. 11 is applicable to a case of activating the rear camera 121b initially and then activating the front camera 121a later. Moreover, although the controller 180 can select a subject in the preview image of the front camera 121a or set a prescribed region in response to a user input, the controller 180 can also set a subject or a prescribed region within the preview image of the front camera 121a automatically.

When there are a plurality of subjects selected from a preview image of a first camera or a plurality of regions are selected, if a plurality of the subjects or all objects included in each of the regions are discovered from a preview image of a second camera, the controller 180 can control an alarm to be output. Although a plurality of the subjects or objects are partially discovered, if the rest of the subjects or objects are not discovered, the controller 180 can move the camera lens or change a zooming magnification of the camera, in order for the second camera to fully receive an image of a plurality of the subjects or objects. This is described in detail with reference to FIGS. 12A to 12C as follows.

Figure 12B:
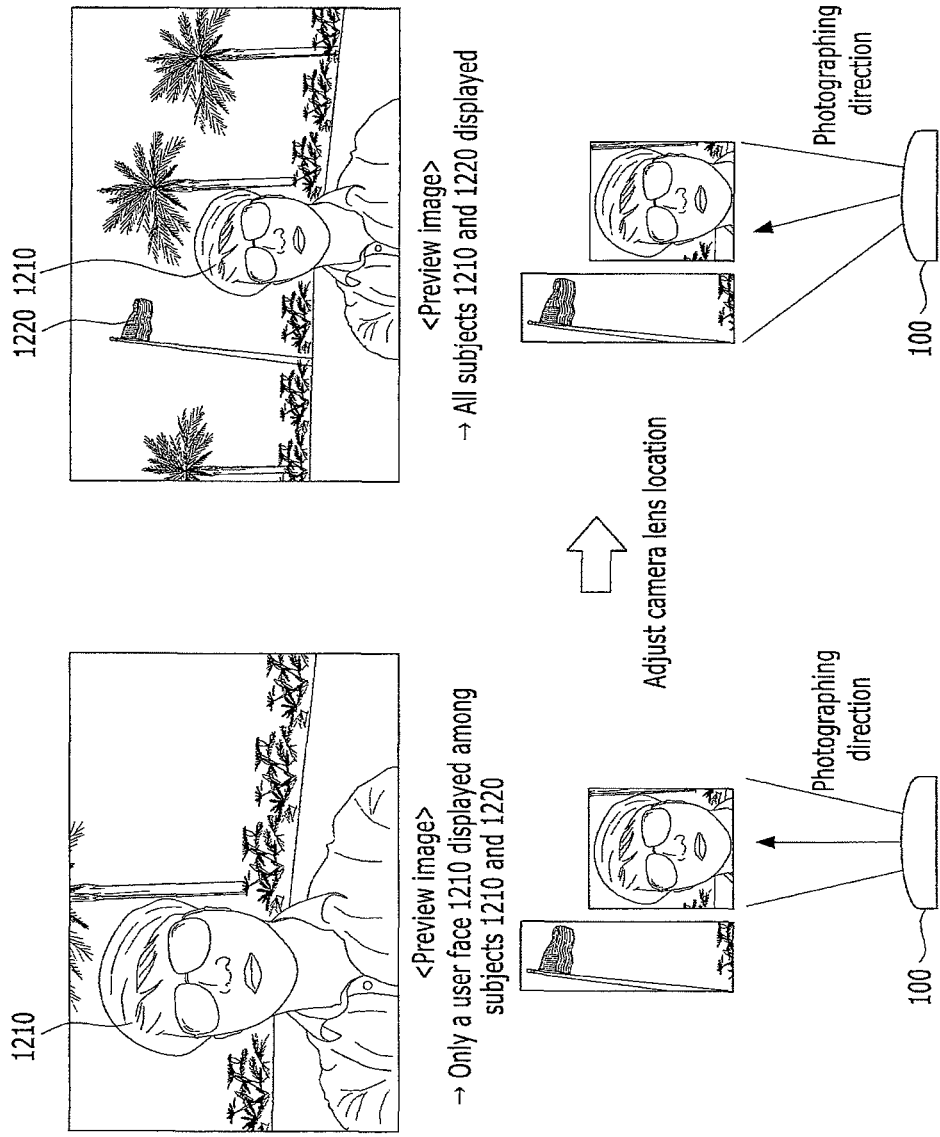

FIGS. 12A to 12C are diagrams to describe another example of a photographing process using a first camera and a second camera according to an embodiment of the present invention. For clarity of the following description, assume that a first camera and a second camera include the front camera 121a and the rear camera 121b, respectively. And, assume that the initial photographing directions of the front camera 121a and the rear camera 121b are set as shown in FIG. 12A (a). If the front camera 121a is activated, referring to FIG. 12A (b), the controller 180 can control a preview image, which is input through the front camera 121a, to be displayed through the display unit 151. Based on a user input to the preview image, the controller 180 can select a subject or set a prescribed region. For clarity of the description, like the example shown in FIG. 12A (b), assume that the selected subjects or objects included in the prescribed region is a user's face 1210 and a flag.

Subsequently, referring to FIG. 12A (c), if a user input for switching to the rear camera 121b is received, the controller 180 can control a preview image, which is input through the rear camera 121b, to be displayed through the display unit 151. As the mobile terminal 100 is rotated or moved, it may happen that all the subjects 1210 and 1220 selected from the preview image of the front camera 121a are accidentally discovered from the preview image of the rear camera 121b. If so, as mentioned in the foregoing description with reference to FIG. 11, the controller 180 controls an alarm to be output through the mobile terminal 100 and also controls a photo or video to be photographed.

Further, as the mobile terminal 100 is rotated or moved, it may happen that the subjects 1210 and 1220 selected from the preview image of the front camera 121a are partially discovered from the preview image of the rear camera 121b by accident. According to the example shown in FIG. 12A (d), the character's face 1210 among a plurality of the previously selected subjects 1210 and 1220 is discovered from the preview image of the rear camera 121b only.

After one portion 1210 among a plurality of the previously selected subjects 1210 and 1220 has been discovered, if the rest of the subject 1220 fails to be discovered despite the elapse of a preset time, the controller 180 can adjust a location of the camera lens or control the camera to zoom out, in order to discover the rest of the subject(s).

For instance, referring to FIG. 12B, the controller 180 can control the rest of the subject 1220 to appear in the preview image by moving the lens of the rear camera 121b. In another instance, referring to FIG. 12C, the controller 180 can control the rest of the subject 1220 to appear in the preview image by enabling the rear camera 121b to zoom out. If all of a plurality of the subjects 1210 and 1220 appear in the preview image of the rear camera 121b, as mentioned in the foregoing description with reference to FIG. 11, the controller 180 can control an alarm to be output.

Like the examples shown in FIG. 12B and FIG. 12C, by adjusting the rear camera 121b in order for a plurality of subjects to appear in a preview image, the preview image of the rear camera 121b can configure the composition similar to that of a preview image of the front camera 121a. Thereafter, if a plurality of the subjects do not deviate from the preview image of the rear camera 121b for a preset time, the controller 180 can control a photo or video to be automatically photographed.

The embodiment described with reference to FIGS. 12A to 12C is applicable to a case of activating the rear camera 121b initially and then activating the front camera 121a later. Moreover, although FIG. 12A (b) shows one example that a subject in the preview image of the front camera 121a is selected in response to a user's touch input, the controller 180 can also select a subject within the preview image of the front camera 121a automatically.

According to the examples shown in FIG. 11 and FIG. 12, based on a subject or object selected from an image input through a front camera, a photo can be automatically photographed through a rear camera. Unlike the examples shown in FIG. 11 and FIG. 12, based on a subject or object selected from a previously photographed photo (e.g., a photo photographed through a first camera), the controller 180 can control a photo to be automatically photographed through a second camera.

Like the former embodiments described with reference to FIG. 11 and FIG. 12, when photographing photos using a first camera and a second camera, when the first camera is activated, the controller 180 can control a photograph mode or a camera setup value to be exactly applied to a case that the second camera is activated.

In this instance, the photograph mode may mean such a mode, in which a camera setup value is set to a default to cope with a situation, as a character photograph mode, a fast photograph mode, a scenery photograph mode, a night photograph mode, or the like. The camera setup value may mean adjustable values (e.g., an aperture, a shutter speed, an exposure, an image quality, etc.) in photographing a photo or video.

By applying the embodiments described with reference to FIG. 11 and FIG. 12, the controller 180 can control an alarm output and a photographing to proceed depending on whether a subject selected from a previously photographed photo or an object included in a region selected from a previously photographed photo appears in a preview image.

For instance, after a prescribed subject has been selected from a previously photographed photo, if a subject selected from a preview image input through a camera is selected, the controller outputs an alarm and can control a photo to be photographed. Further, the controller 180 can photograph a photo newly by applying the same photograph mode or setup value of the previously photographed photo.

In this instance, the previously photographed photo may be photographed through the first camera and the newly photographed photo may be based on an image input through the second camera, by which the present invention is non-limited. In another instance, if a preview image is determined as configuring a composition similar to that of a previously photographed photo, it can control a photo to be automatically photographed. This is described in detail with reference to FIG. 13 as follows.

FIG. 13 is a diagram to describe an embodiment of taking a photo having a composition similar to that of a previously taken photo according to an embodiment of the present invention. For clarity of the following description, assume that a previously photographed photo is identical to that shown in FIG. 13 (a).

Referring to FIG. 13, the controller 180 can extract an information on a subject from a previously photographed photo. In this instance, the information on the subject may include at least one of an identification information of the subject, a location information of the subject in the photo, an inter-subject distance information for a presence of a plurality of subjects included, and the like.

For instance, from the photo shown in FIG. 13 (a), the controller 180 can extract such subjects as a user's face, a flag and the like and can also extract at least one of a location information of the user's face in the photo, a location information of the flag in the photo, and a distance information on a distance between the user's face and the flag.

Subsequently, referring to FIG. 13 (b), as the camera is activated, a preview image can be displayed through the display unit. The controller 180 can determine whether the preview image displayed through the display unit configures the same composition of the previously photographed photo. In particular, the controller 180 can determine whether both of the preview image and the previously photographed photo configure the same composition based on at least one of whether a photo photographed through the front camera is included in a preview image input through the rear camera, whether a location of a subject is located in a prescribed threshold distance from a location in a photo, whether a difference between a size of a subject and a size in a photo belongs to an error range, and whether a difference between each inter-subject distance among a plurality of subjects and an inter-subject distance in a photo belongs to an error range.

Since not the flag but the user's face is discovered from the preview image shown in FIG. 13 (b), the controller 180 can determine that the same composition is not configured. Referring to FIG. 13 (c), as the mobile terminal 100 is moved, both a human face and a flag may be discovered accidentally. In addition, the controller 180 can determine whether the preview image configures the same composition of the previously photographed photo in further consideration of a location of the human face in the preview image, a location of the flag in the preview image, a distance between the human face and the flag, and the like.

If the preview image shown in FIG. 13 (c) is determined as configuring the same composition of the previously photographed photo, the controller 180 can output an alarm. Moreover, if the same composition is maintained during a prescribed time, the controller 180 can control a photo to be automatically photographed.

According to the embodiment shown in FIG. 13, a previously photographed photo and a newly photographed photo may be taken using different cameras, respectively (e.g., the previously photographed photo is taken through the first camera, while the newly photographed photo is created based on a preview image input through the second camera), by which the present invention is non-limited. In this instance, the controller 180 can newly photograph a photo by applying the same photograph mode or setup value of the previously photographed photo.

According to the descriptions with reference to FIGS. 11 to 13, after an alarm has been output, a photo or video is photographed. Unlike the descriptions, the controller 180 can photograph a photo or video by skipping the output of the alarm. After a prescribed region has been set in a preview image input through the camera 121, if an object enters the prescribed region, the controller 180 outputs an alarm and can also control a photo or video to be photographed automatically. This is described in detail with reference to FIG. 14 and FIG. 15 as follows.

Figure 14:
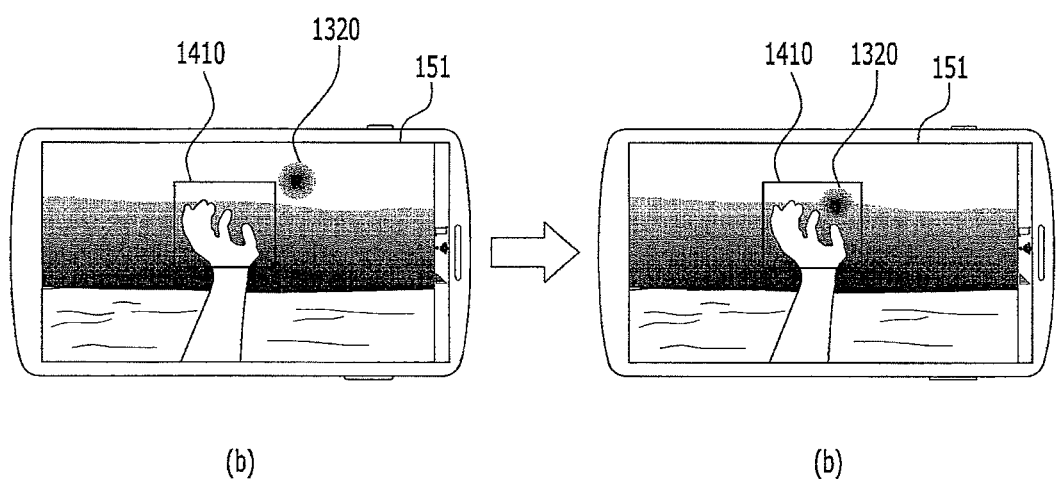
FIG. 14 is a diagram to describe one embodiment of automatically taking a photo in case of an entry of a new object into a set region according to an embodiment of the present invention.

FIG. 14 is a diagram to describe one embodiment of automatically taking a photo for an entry of a new object into a set region according to an embodiment of the present invention. Referring to FIG. 14 (a), based on a user's touch input, the controller 180 can set a prescribed region 1410 in a preview image. As mentioned in the foregoing description with reference to FIG. 5A, the set region 1410 can be visually identified.

If a new object 1420 appears in the set region 1410, the controller 180 outputs an alarm and can also control a photo or video to be photographed automatically. Like the example shown in FIG. 14 (b), if the sun 1420 appears in the set region 1410, the controller 180 can control an alarm to be output through the mobile terminal 100.

If the object 1420 newly appears in the set region 1410 or the newly appearing object 1420 does not deviate from the preview image for a preset time, the controller 180 can control a photo or video to be photographed automatically. When an object has been already included in a region set by a user, if an object newly appears in the set region except a case that the object included in the set region reappears, the controller may control a photo or video to be photographed.

Figure 15:
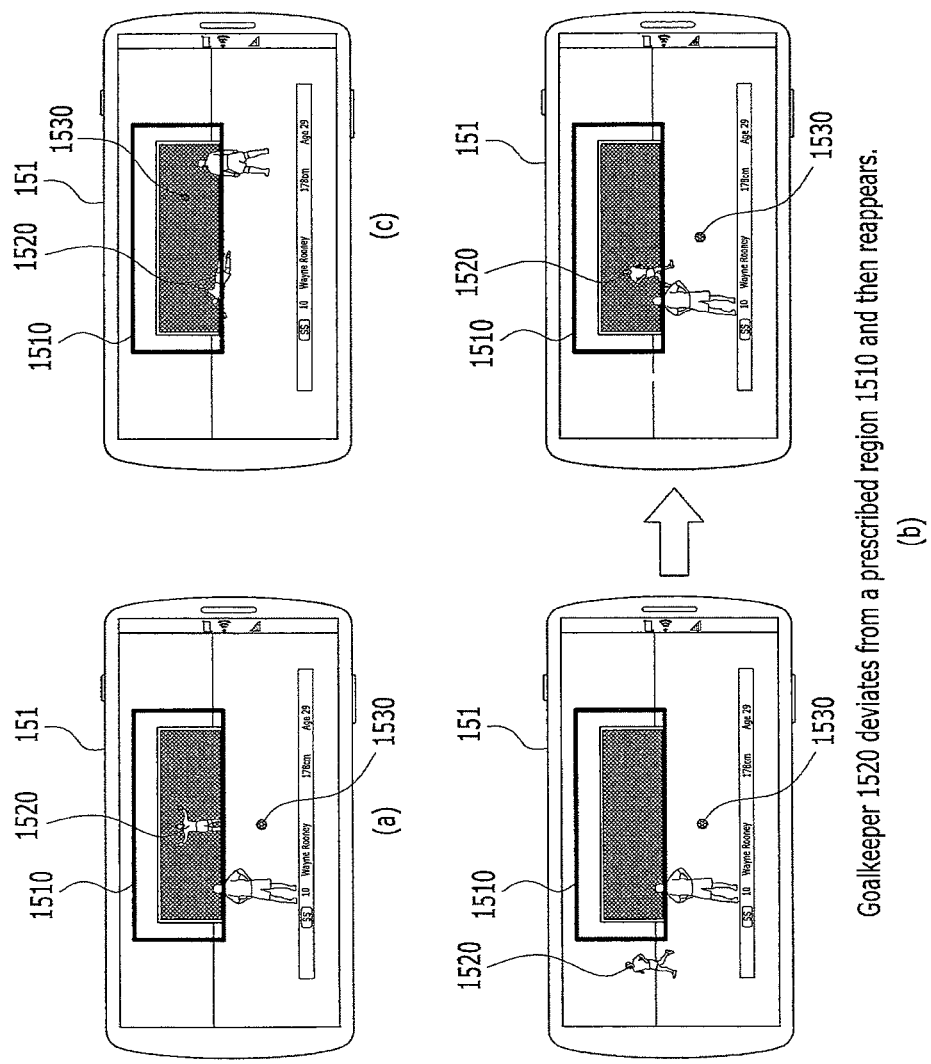
FIG. 15 is a diagram to describe another embodiment of automatically taking a photo in case of an entry of a new object into a set region according to an embodiment of the present invention.

FIG. 15 is a diagram to describe another embodiment of automatically taking a photo for an entry of a new object into a set region according to an embodiment of the present invention. Referring to FIG. 15 (a), based on a user's touch input, the controller 180 can set a prescribed region 1510 in a preview image. As mentioned in the foregoing description with reference to FIG. 5A, the set region 1410 can be visually identified.

According to the example shown in FIG. 15 (a), a goalkeeper has been already included in the set region 1510. Like the example shown in FIG. 15 (b), if the goalkeeper 1520 disappears from the set region 1510 and then reappears in the set region 1510, the controller 180 can not photograph a photo or video. Yet, if the goalkeeper 1510 disappears or reappears, as mentioned in the foregoing description with reference to FIG. 5B, an alarm may be output through the mobile terminal 100.

Further, referring to FIG. 15 (c), if a new object (e.g., a soccer ball) 1530 appears in the set region 1510, the controller 180 can output an alarm. If the object 1530 newly appears in the set region 1510 or the newly appearing object 1530 does not deviate from the preview image for a preset time, the controller 180 can control a photo or video to be photographed automatically.

According to the descriptions with reference to FIG. 14 and FIG. 15, if a new object appears in a set region, an alarm is output and a photo or video is then photographed. Further, unlike the descriptions, the controller 180 can photograph a photo or video by skipping the output of the alarm.

Accordingly, embodiments of the present invention provide various effects and/or features. First of all, the present invention can provide a mobile terminal capable of enhancing user's convenience. In particular, if a subject deviates from a preview image, the present invention can provide a mobile terminal and controlling method thereof, by which an alarm can be output.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a camera;
a display unit configured to display a preview image input through the camera; and
a controller configured to:
select an object in the preview image in response to a user input for touching the object or setting a specific region comprising the object; and
output an alarm when the object moves out from the preview image.

2. The mobile terminal of claim 1, wherein the controller is configured to:
detect the object staying in the preview image or the specific region for a prescribed duration, and
control the camera take a photo or video.

3. The mobile terminal of claim 1, wherein the controller is configured to:
track a movement of the object, and
adjust a photographing direction of the camera based on the tracked movement of the object.

4. The mobile terminal of claim 1, wherein the controller is configured to:
predict the object as moving out from the preview image, and
control the camera to zoom out to extend a viewing angle.

5. The mobile terminal of claim 1, wherein the controller is configured to:
record a video,
detect the object moves out from the preview image or the specific region while recording the video, and
control the camera to pause the recording of the video.

6. The mobile terminal of claim 5, wherein the controller is configured to:
detect the object reappearing in the preview image or the specific region, and
control the camera to resume the recording of the video.

7. The mobile terminal of claim 1, wherein the controller is configured to:
detect a new object appearing in the preview image or the specific region, and
output the alarm indicating the new object appearing in the preview image or the specific region.

8. The mobile terminal of claim 1, wherein the controller is configured to:
record a video,
detect a new object appearing in the preview image or the specific region, and
control the camera to pause the recording of the video.

9. The mobile terminal of claim 8, wherein the controller is configured to:
detect the new object disappearing from the preview image or the specific region, and
control the camera to resume the recording of the video.

10. The mobile terminal of claim 1, wherein the controller is configured to:
detect a new object appearing in the specific region, and
control the camera to take a photo or video.

11. The mobile terminal of claim 1, wherein the camera comprises a first camera and a second camera,
wherein one of the first camera and the second camera is located a front side of the mobile terminal, and the other is located a rear side of the mobile terminal.

12. The mobile terminal of claim 11, wherein if the object is selected via a first preview image input via the first camera and then the object is discovered from a second preview image input via the second camera, the controller is configured to control one of the first camera or the second camera to take a photo or video.

13. The mobile terminal of claim 12, wherein the controller is configured to:
    maintain a photograph mode, set during activation of the first camera, even with the second camera being activated.

14. A mobile terminal comprising:
    a camera;
    a display unit configured to display a preview image input through the camera; and
    a controller configured to:
    extract an identification information of an object from a previously photographed photo,
    determine the extracted identification information of the object corresponds to the preview image input via the camera, and
    control the camera to take a new photo.

15. The mobile terminal of claim 14, wherein the new photo has at least one value equal to at least one of a photograph mode and a photographing setup value on photographing the previously photographed photo.

16. The mobile terminal of claim 14, wherein the camera comprises a first camera and a second camera,
    wherein the previously photographed photo is photographed through the first camera, and
    wherein the new photo is photographed through the second camera.

17. A method of controlling a mobile terminal, the method comprising:
    displaying, via a display unit of the mobile terminal, a preview image input through a camera of the mobile terminal;
    selecting an object in the preview image in response to a user input for touching the object or setting a specific region comprising the object; and
    outputting, via a controller of the mobile terminal, an alarm when the object moves out from the preview image.

18. The method of claim 17, further comprising:
    detecting the subject staying in the preview image or the specific region for a prescribed duration; and
    controlling the camera take a photo or video.

19. The method of claim 17, further comprising:
    tracking a movement of the object; and
    adjusting a photographing direction of the camera based on the tracked movement of the object.

20. The method of claim 17, further comprising:
    predicting the object as moving out from the preview image; and
    controlling the camera to zoom out to extend a viewing angle.

* * * * *